(12) United States Patent
Koh

(10) Patent No.: US 11,190,629 B1
(45) Date of Patent: Nov. 30, 2021

(54) SECTIONED WEARABLE SMARTPHONE DEVICES

(71) Applicant: Wei Hu Koh, Irvine, CA (US)

(72) Inventor: Wei Hu Koh, Irvine, CA (US)

( * ) Notice: Subject to any disclaimer, the term of this patent is extended or adjusted under 35 U.S.C. 154(b) by 5 days.

(21) Appl. No.: 16/995,445

(22) Filed: Aug. 17, 2020

(51) Int. Cl.
| | |
|---|---|
| *H04M 1/02* | (2006.01) |
| *G06F 1/16* | (2006.01) |
| *H05K 1/00* | (2006.01) |
| *H05K 5/00* | (2006.01) |
| *H05K 7/00* | (2006.01) |
| *G06F 3/041* | (2006.01) |
| *H04N 5/225* | (2006.01) |

(52) U.S. Cl.
CPC .......... *H04M 1/0208* (2013.01); *G06F 3/041* (2013.01); *H04M 1/0264* (2013.01); *H04M 1/0268* (2013.01); *G06F 2203/04102* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 8,493,726 B2 * | 7/2013 | Visser | ................. | G09F 9/301 361/679.3 |
| 8,508,920 B2 * | 8/2013 | Huitema | ............ | G06F 1/1637 361/679.01 |
| 9,071,673 B2 * | 6/2015 | Choi | ............. | H04M 1/0247 |
| 9,152,180 B2 * | 10/2015 | Kim | ............. | G06F 1/1652 |
| 9,318,070 B2 * | 4/2016 | Park | ............. | G09G 5/00 |
| 10,013,020 B2 * | 7/2018 | Hong | ............. | G06F 1/1686 |
| 10,048,726 B2 * | 8/2018 | Nakagawa | ......... | G06F 3/0482 |
| 10,083,096 B1 * | 9/2018 | Donohue | ......... | G06F 11/1471 |
| 10,146,354 B2 * | 12/2018 | Kim | ............. | G06F 3/0346 |
| 10,194,543 B2 * | 1/2019 | Seo | ............. | H05K 5/0217 |
| 10,209,743 B1 * | 2/2019 | Hsu | ............. | G06F 1/1681 |
| 10,222,835 B2 * | 3/2019 | Lim | ............. | H04M 1/0237 |
| 10,274,995 B2 * | 4/2019 | Seo | ............. | G06F 1/1652 |
| 10,429,894 B2 * | 10/2019 | Xia | ............. | G06F 1/1649 |
| 10,431,129 B2 * | 10/2019 | Wakata | ............. | H01L 27/32 |
| 10,481,641 B2 * | 11/2019 | Lee | ............. | G06F 1/1652 |
| 10,571,962 B2 * | 2/2020 | Araki | ............. | G06F 1/1681 |
| 10,601,968 B1 * | 3/2020 | Koh | ............. | G06F 1/1618 |
| 10,613,588 B2 * | 4/2020 | Chang | ............. | H05K 5/0217 |
| 10,623,537 B2 * | 4/2020 | Lee | ............. | G06F 1/1652 |
| 10,716,227 B2 * | 7/2020 | Heng | ............. | G06F 1/1624 |
| 10,775,849 B2 * | 9/2020 | Fujimoto | ............. | G06F 1/1641 |
| 10,845,850 B1 * | 11/2020 | Kang | ............. | H04M 1/022 |
| 10,855,819 B2 * | 12/2020 | Lee | ............. | G06F 1/1641 |
| 10,893,130 B1 * | 1/2021 | Song | ............. | H04M 1/0268 |
| 10,912,214 B2 * | 2/2021 | Kang | ............. | H05K 5/0217 |
| 10,965,796 B2 * | 3/2021 | Yang | ............. | H04M 1/0268 |
| 11,003,217 B2 * | 5/2021 | Cha | ............. | G06F 1/1652 |
| 11,032,920 B2 * | 6/2021 | Kim | ............. | H05K 5/0226 |
| 11,032,929 B2 * | 6/2021 | Yoo | ............. | G06F 1/1616 |

(Continued)

*Primary Examiner* — Tuan A Tran

(57) ABSTRACT

A sectioned tablet smartphone device that is bendable for use as a wearable for carrying around or hands-free applications; the device is comprised of a plurality of short body sections linked by bendable hinges that are integrated to device casing, a bendable and slidable front touchscreen display connected to an extension stored in a rotating end scroll, and a detachable strap on casing backside as a protective cover when device is in tablet mode and as a wristband when device is in wearable mode.

15 Claims, 11 Drawing Sheets

(56) References Cited

U.S. PATENT DOCUMENTS

| | | | |
|---|---|---|---|
| 11,051,413 B2* | 6/2021 | Yang .................... | H05K 5/0017 |
| 11,061,445 B2* | 7/2021 | Kim ..................... | G06F 1/1641 |
| 2012/0162876 A1* | 6/2012 | Kim .................... | H04M 1/0237 |
| | | | 361/679.01 |
| 2012/0212433 A1* | 8/2012 | Lee ....................... | G06F 1/1652 |
| | | | 345/173 |
| 2020/0178404 A1* | 6/2020 | Um ...................... | H05K 5/0017 |
| 2020/0249722 A1* | 8/2020 | Cha ..................... | H04M 1/0216 |

* cited by examiner

SECTIONED WEARABLE SMARTPHONE DEVICES

TECHNICAL FIELD

This disclosure relates to a portable and wearable mobile smartphone device.

BACKGROUND

Most smartphones have a rigid and flat rectangular form factor like a tablet. As the screen sizes become bigger, the hand-held mobile phone sizes also become larger, to the point of being difficult to be held securely by one hand. As a result, foldable phones are made available. A foldable phone may be folded once or multiple times like a wallet; after folding, however, the phone body thickness usually is more than doubled. To avoid such an increase in body thickness for folded devices, unibody bendable phone devices that can be bent to become round-shaped wearables are available. However, such devices need extra-long body length to form a fully enclosed circular band for wearing around the wrist. Such bendable devices also often are too thick to be worn comfortably on a person's wrist. Large-sized mobile smartphones also are difficult to fit inside one's pocket or small purses for carrying. What is needed is a versatile, dual-use device that can be used as a flat tablet phone normally but transforms into a temporary wearable device that can be conveniently and securely worn on a person's wrist or upper arm when the person's hands are occupied.

SUMMARY

The present invention provides a dual-use, hand-held mobile smartphone device comprised of a device casing having a plurality of sections linked by bendable hinges, a thin strap on the device backside as a protective cover, and a slidable, bendable front touchscreen display connected to a rotating scroll. The high-resolution color touchscreen display covers the entire device front face and extends into an end rotating scroll containing an extra display segment that extends front display when the device is bent to form a polygon-shaped wearable. When in a tablet format, the device body sections remain straight, with a flat display on top and a thin strap on bottom as a back cover. When the device body section hinges are bent, the device turns into a wearable polygon with sectioned displays in the front and the thin back cover turning into a flexible strap that allows mounting the device on a person's wrist or upper arm. Hence, this sectioned device can be used for dual-purposes: a hand-held flat tablet phone and a wearable for hands-free uses or carrying around.

The device section hinges are built around the casing walls so that interior spaces inside each section are open and connected to each other for distribution of internal components. These hinges are built to be bent only inwardly towards the casing backside by expansion at the upper portion while contraction in the lower portion. Such section casings having integrated hinges may be made from thin metal or alloy sheets, engineering plastics, composite materials, or carbon fiber fabrics by stamping, molding, or other appropriate methods. The section internal spaces are open to each other so that device internal components can be distributed and remain interconnected. In a first embodiment of this invention, all short sections have the same lengths and dimensions. In a second embodiment, short sections have different lengths. For example, in a three-sectioned device, the center section is longer than the two adjacent side sections to function as a head section. For a hand-held smartphone device, the number of short sections should be between three to five, whether or not it has a head section. Large-sized electronic components such as the CPU, memory, or battery pack can be more conveniently placed inside larger sections. Because certain internal components could be as large as 20×20 $mm^2$, a practical length of the head section would be at least 25 mm. As an example, a 140 mm five-section device can have one head section 36-mm long and four short sections each 26-mm long, inclusive of the in-between hinges. For a device having four equal sections, each section can be 35-mm long. Multiple battery packs can be distributed over several sections to gain more power capacity. Other smaller components may be assembled on small boards distributed throughout the sections and linked by flexible circuits and connectors for communication between sections.

When a device is mounted on a wrist like a large smartwatch or someone's upper arm like an armband, the head section display can remain functional while displays on surrounding sections be turned off to reduce power consumption.

The device body section hinges are allowed to bend backwards only when the back strap is pulled apart, turning into a wearable with angled sections in front and the elastic strap on back as a belt. The size of strap opening can be adjusted by having a pair of locking sliding hinges along grooves or tracks on a section casing. The sliding hinges can be locked at any position along the sliding groove and also be removeable so that the strap can be opened from one end or removed completely from the device casing for repair, cleaning, or exchange to a different style strap. The strap shape can vary for ease of mounting and wearing; thin magnets pieces or micro-clips can be embedded to ensure tight adhesion to the device body backside.

The continuous front touchscreen display assembly can use appropriate flexible display technologies such as organic light emitting diode (OLED), microLED, or quantum LED (QLED) on suitable flexible substrates. The touchscreen display cover layer is also flexible and is treated as part of the display assembly. When the device body sections are bent, the front display bending areas above each joint are being stretched and will shift if display edges are allowed to slide. By fixing only one end of the display and allowing the other three sides to slide, the display length and area will be elongated according to the section bending angles. Therefore, the two long edges of the display are engrooved in shallow grooves along section housing sidewalls to be able to slide, and the end short edge is connected to a rotating scroll containing extra segment of flexible display rolled inside the end scroll. The spring-loaded rotating end scroll provides tension to keep front display flat, while self-adjusting based on the section bending angles. The exact length of additional display that needs to be stored in the scroll can be pre-calculated for each device embodiment based on the number of hinge joints and their maximum bending angles. During device bending, the extra display unwinds from the roller to the device front face; when sections are snapped back to a straight line, the excessive display area is retracted back into the rotating scroll.

The thin strap attached to the back of sectioned device body can be made from expandable metallic bands, stretchable flex fine metal mesh, leather, or synthetic leather-like elastic materials such as polyurethane, silicone, and rubber, etc. For devices having rear-facing camera lenses located on the back of a head section, the strap has an open window or optically-clear cover around the lenses so that the lenses line of sight is not blocked. Another embodiment of this invention uses a pop-up, rotating camera on the top section to avoid being obstructed by the strap during picture-taking. The pop-up camera module lenses can also be rotated to face the front, back, or other angles.

For the device to be worn more comfortably as a wearable, the back strap mid-section may be shaped like a narrow band or a belt for ease of mounting and removal from a person's wrist or arm. The strap shapes may vary yet still provide a steady support when the device is placed on a flat surface. One end of the strap may be disconnected to open the belt, or both ends disconnected to remove or exchange the strap.

Lastly, when the body sections are bent slightly, the device may be placed sideways on its edge for hands-free viewing.

BRIEF DESCRIPTION OF THE DRAWINGS

The accompanying drawings are used to provide further understanding of this disclosure and as examples of different embodiments.

DETAILED DESCRIPTION

The disclosure of the present sectioned device invention has different embodiments and the accompanying drawings are illustrations for various embodiment examples.

Figure 1:
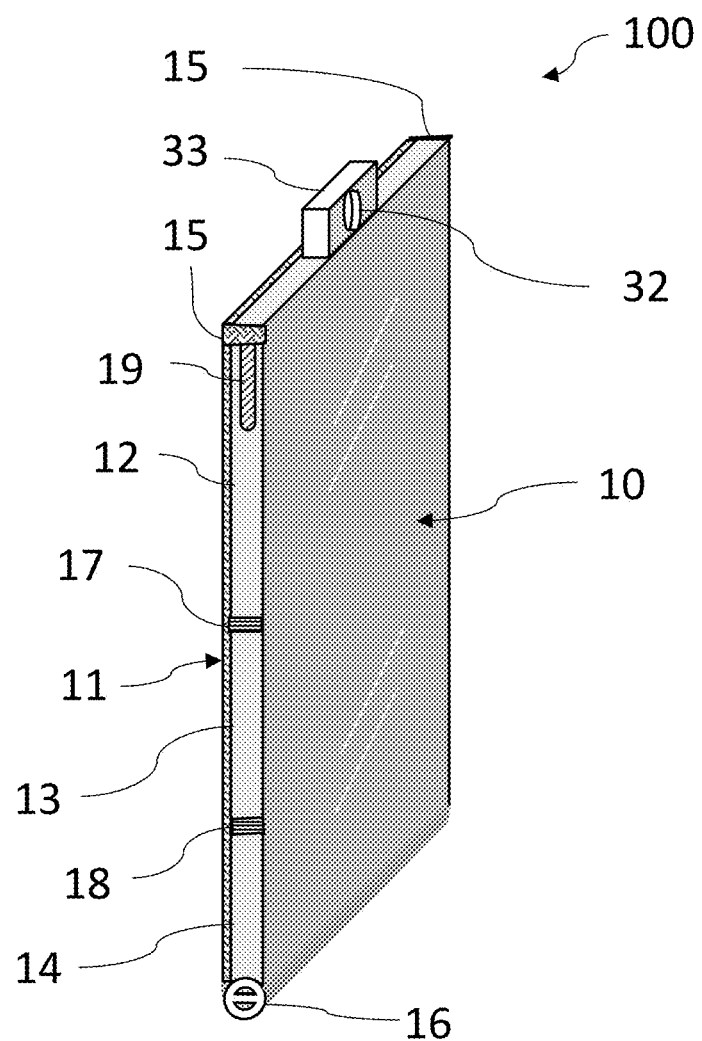
FIG. 1 illustrates the perspective view of a device having a pop-up camera module and a three-sectioned body with two flexible hinges; a thin strap attached to device backside has a pair of sliding hinges along the sidewalls.

FIG. 1 shows a sectioned tablet device 100 having three linked sections 12, 13, and 14 linked by hinges 17 and 18, respectively. A continuous flat touchscreen display 10 covering the whole device front face extends into rotating end scroll 16 on section 14, in which an additional segment of display 10 is stored. Bendable hinge 17 links sections 12 and 13, and hinge 18 links sections 13 and 14. Device 100 backside is covered by strap 11 as a back cover. A sliding and lockable hinge 15 connected to strap 11 is located inside groove 19. Rotating end scroll 16 at the bottom of section 14 contains extra segment of front display 10 that is rolled up around roller scroll 16. Rotating scroll 16 is spring-loaded to apply tension to display 10 to keep it flat and wrinkle-free.

Above body section 12 is a retractable, pop-up camera module 33 having its lens 32 facing the front. Camera module 33 is rotatable so that lens 32 may be turned backwards to face the rear. At the pop-up position, lens 32 has an un-obstructed line of sight for picture-taking.

Figure 2:
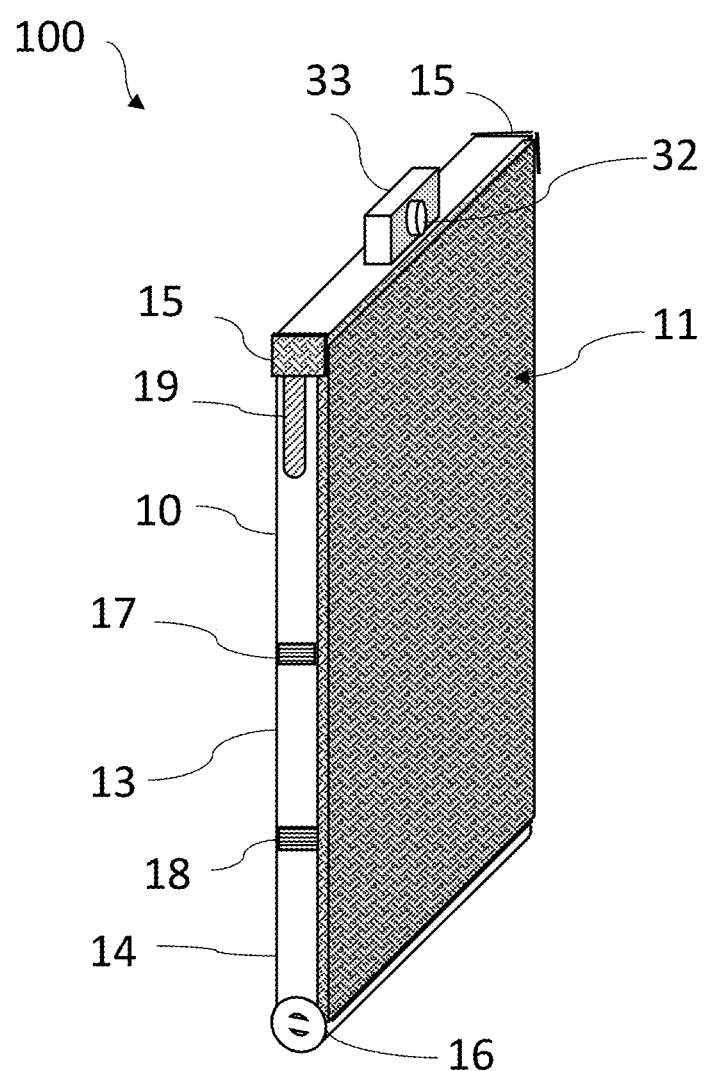
FIG. 2 illustrates the perspective view of a three-sectioned device from the backside; the strap covers the entire backside as a protective cover, with a pair of sliding hinges along the sidewalls. A pop-up camera module having its lens facing the rear is on the device top edge.

FIG. 2 illustrates tablet device 100 having a strap 11 covering fully the backside as a protective cover. Strap 11 is connected to a pair of slidable and lockable hinges 15 located on groove 19 of section 12 sidewalls. Strap 11 is also detachable from device 100 for repair, cleaning, or exchange for other straps having different style or shapes.

Figure 3:
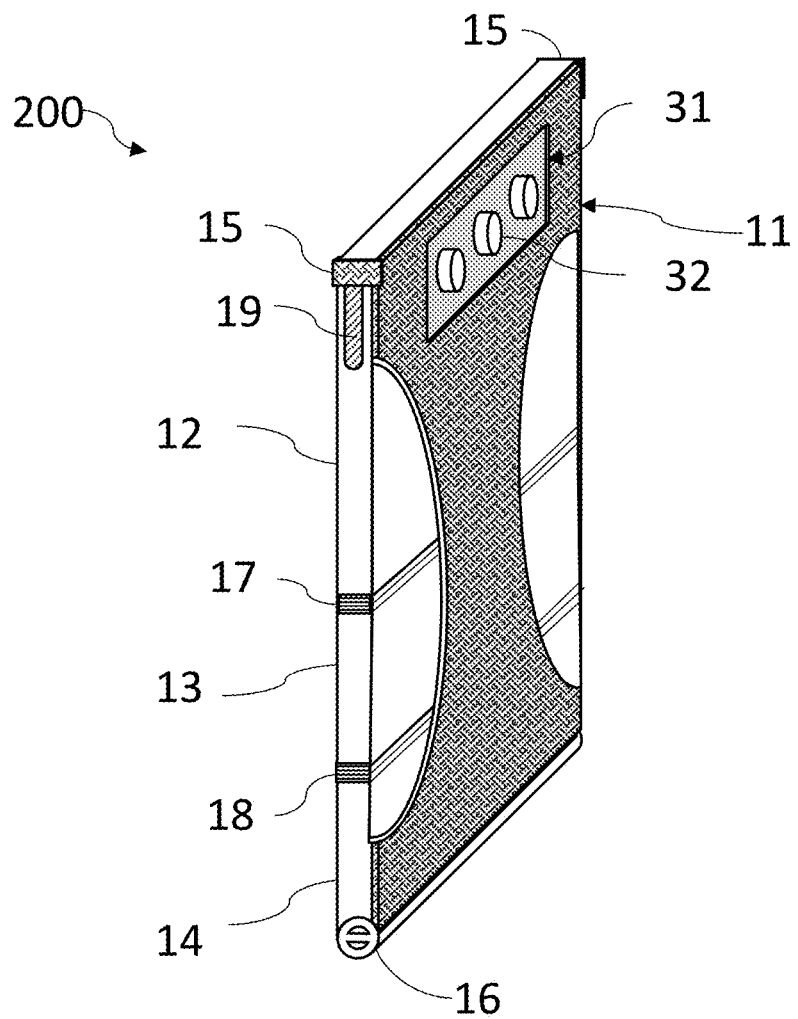
FIG. 3 illustrates the perspective view of a three-sectioned device with a trimmed narrow strap band and a window opening surrounding the rear-facing camera lenses, and a pair of sliding hinges on the top section sidewalls.

FIG. 3 illustrates a different tablet device embodiment 200 having in-body rear facing camera lenses 32 on top section 12. Strap 11 provides a clear window 31 for camera lenses 32 to have an un-obstructed line of sight. Strap 11 mid-section has a trimmed narrow band for ease of mounting when device 200 is turned into a wearable. Although part of device 200 backside is exposed, strap 11 still allows device 200 to be placed on a flat surface without tilting or wobbling.

Figure 4:
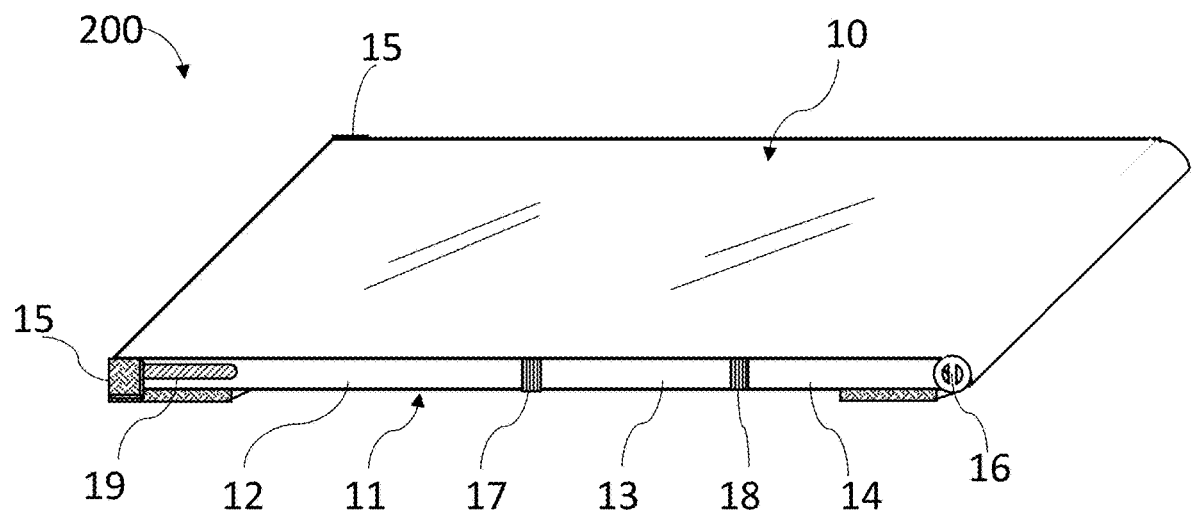
FIG. 4 illustrates the perspective view of a horizontal three-sectioned device having its front display curved down into end rotating scroll that stores extra segment of flexible display to cover bending extension.

FIG. 4 shows a perspective view of device 200 as a tablet phone in a horizontal position. Flexible display 10 has its top edge near hinge 15 anchored to section 12, but its two long edges along sidewalls of section 13 and 14 are slidable and can shift up or down when hinges 17 and 18 are bent. The additional length of display 10 needed to cover expansion zones above hinges 17 and 18, respectively, are compensated by extruding more display area from rotating end scroll 16 at bottom of section 14. Scroll 16 is spring-loaded and can rotate freely in self-adjusting manner when hinges 17 and 18 are being bent, while spring-generated tension from rotating scroll 16 keeps display 10 flat and wrinkle-free. Lockable strap hinges 15 are locked at top position in groove 19 to keep strap 11 adhered tightly to the backside of device 200.

Figure 5A:
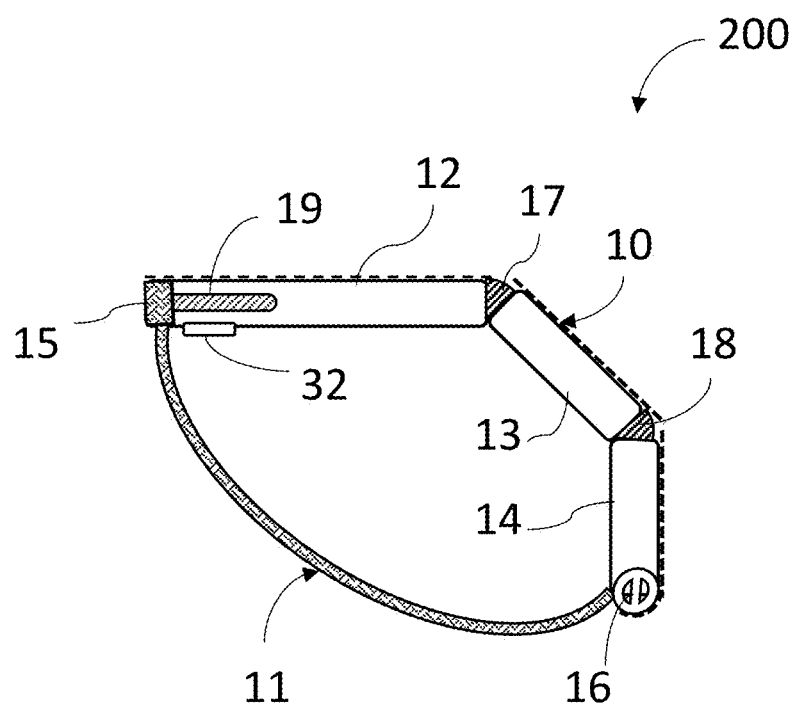
FIG. 5A illustrates the sideview of a bent three-sectioned device in wearable mode when its back strap is pulled apart. The strap sliding hinges are located at the outer position in the sliding groove. Dashed lines represent sliding front display that extends into and wraps around the end roller scroll.

FIG. 5A illustrates the sideview of device 200 in a bent, wearable mode, in which head section 12 and peripheral sections 13 and 14 form the front sides of a polygon while semi-circular strap 11 is the flexible side of the polygon functioning as a wristband. Bent hinges 17 and 18 are triangular with expanded tops and contracted bottoms. Dash lines 10 above sections 12, 13, and 14 indicate the slidable edges of display that move up and down with rotating end scroll 16. Display 10 side edges may be embedded inside shallow grooves carved on housing sidewalls of sections 12, 13, and 14, respectively.

Figure 5B:
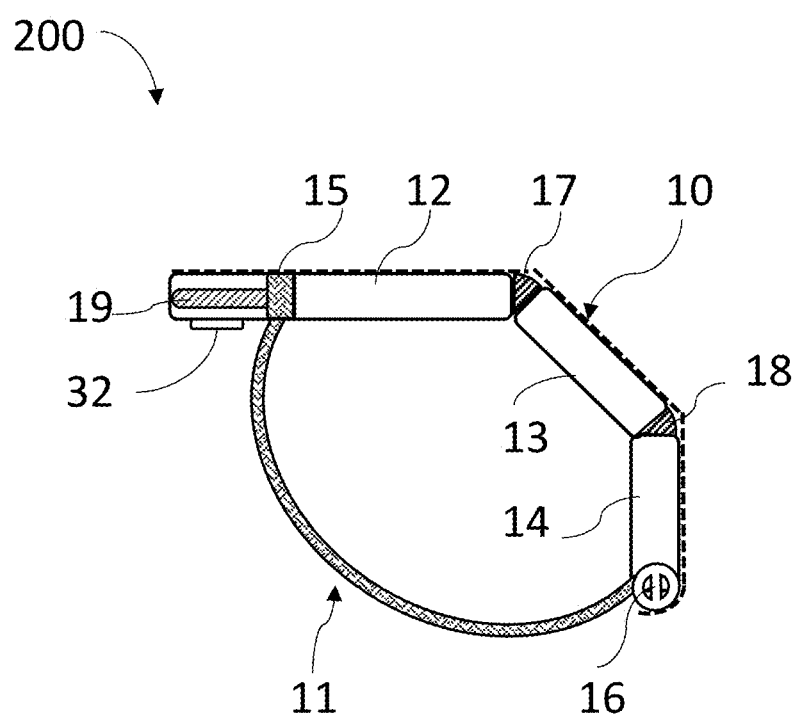
FIG. 5B illustrates the sideview of the same three-sectioned device in wearable mode, in which the strap sliding hinges are moved to the inner position in the sidewall groove.

In FIG. 5A, device 200 has a rear-facing, in-body camera lens 32 in section 12 and strap hinge 15 is locked at the top of groove 19; camera lens 32 could be obstructed by strap 11 unless there is a clear window. In FIG. 5B, the same device 200 is shown with strap hinge 15 moved to lower end of groove 19 so that camera lens 32 stays above strap 11.

Figure 6:
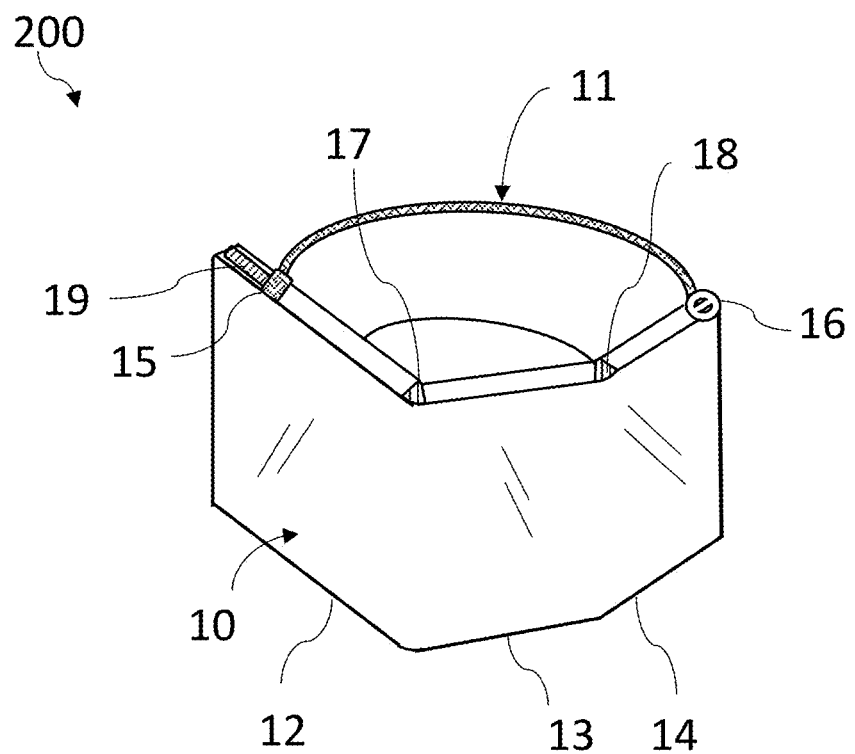
FIG. 6 illustrates the perspective view of the front display of a bent three-sectioned device with the semicircle strap band in the back.

FIG. 6 is a perspective view of device 200 from the front side showing display 10 having three flat areas on sections 12, 13, and 14, respectively. Strap 11 can be elastic or expandable like a watchband for ease of mounting; or, sliding hinge 15 may be detached from groove 19 for mounting of device 200 and re-attached after mounting.

Figure 7:
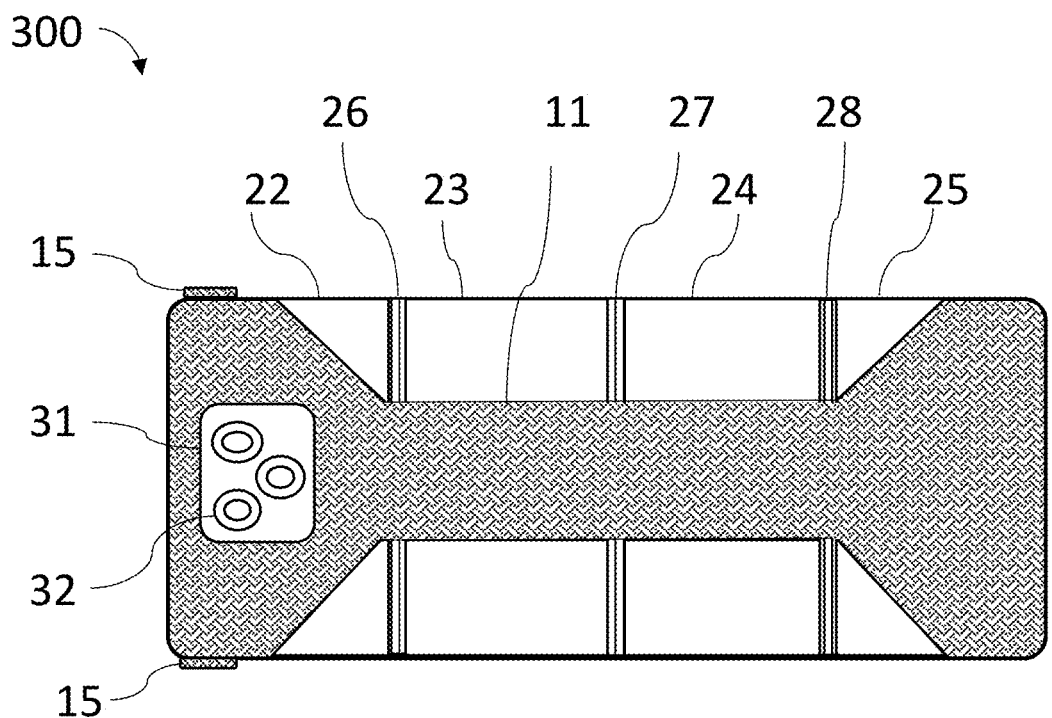
FIG. 7. Illustrates an example of a back strap having a narrow mid-section band on the back of a four-sectioned device and a window opening for rear-facing camera lenses; part of the four section housing case backsides and three inter-linking hinges are exposed and visible.

FIG. 7 illustrates the backside of device 300 having four equal-sized body sections 22, 23, 24, and 25 and in-between hinges 26, 27, and 28. Strap 11 med-section is shaped like a watchband for ease of mounting and comfort of wearing when device 300 is used as a wearable. A clear window 31 on strap 11 allows lenses 32 to have clear line of sight for picture-taking. A pair of strap hinges 15 are shown located along the sidewalls of section 22, but other designs and locations of detachable strap hinges are also possible.

Figure 8A:
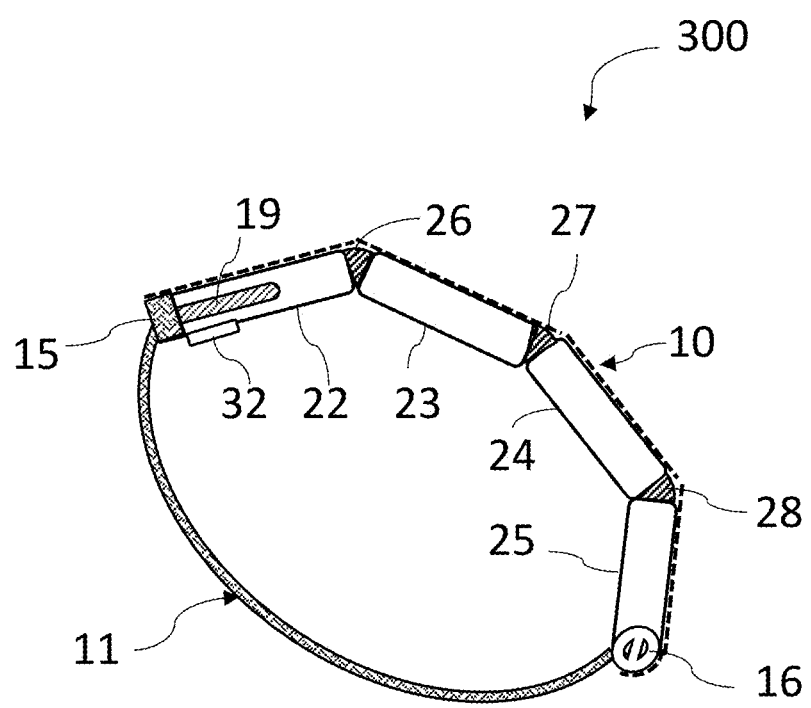
FIG. 8A illustrates the side view of a four-sectioned device in wearable mode; the strap hinges are located at the outer end of the sliding groove. Dashed lines represent front display that can slide up and down from the rotating scroll.
Figure 8B:
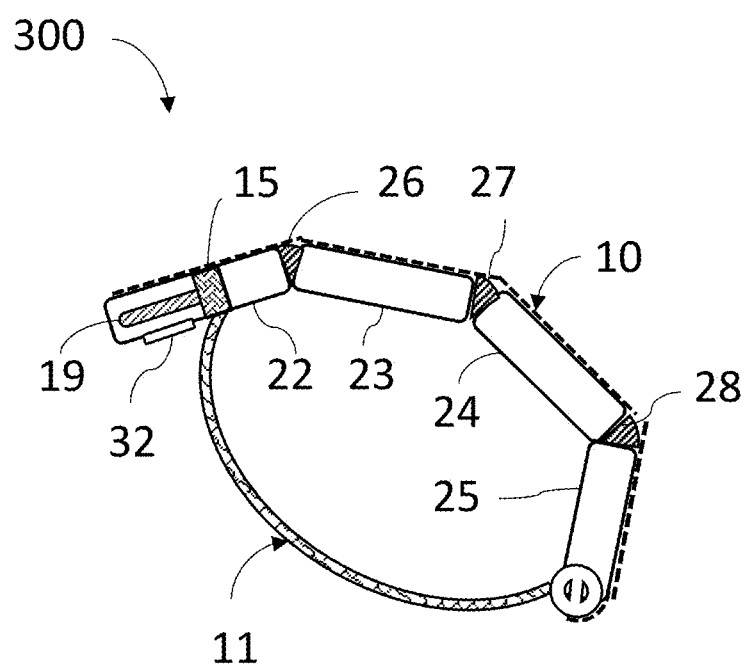
FIG. 8B illustrates a four-sectioned device in wearable mode; the strap hinges are shifted to the inner end of the sliding groove to stay below the camera lens.

FIG. 8A illustrates the sideview of device 300 having four equal sections 22, 23, 24, and 25 in a wearable mode, with strap 11 as a semi-circular belt for mounting and tying device 300 around an arm or wrist. Device 300 has a rear-facing lens 32 and strap hinge 15 is located on the top position of groove 19. In FIG. 8B, device 300 strap hinge 15 is shifted to lower position of groove 19 so that strap 11 stays beneath lens 32. Strap hinge 15 can also be used for adjusting the opening size of strap 11. Dash lines 10 indicate edges of display 10 that can slide up or down to cover expanded joints over hinges 26, 27, and 28. Spring-loaded end scroll 16 can rotate freely as needed when device 300 sections are bent or snapped back into a linear, tablet form.

Figure 9:
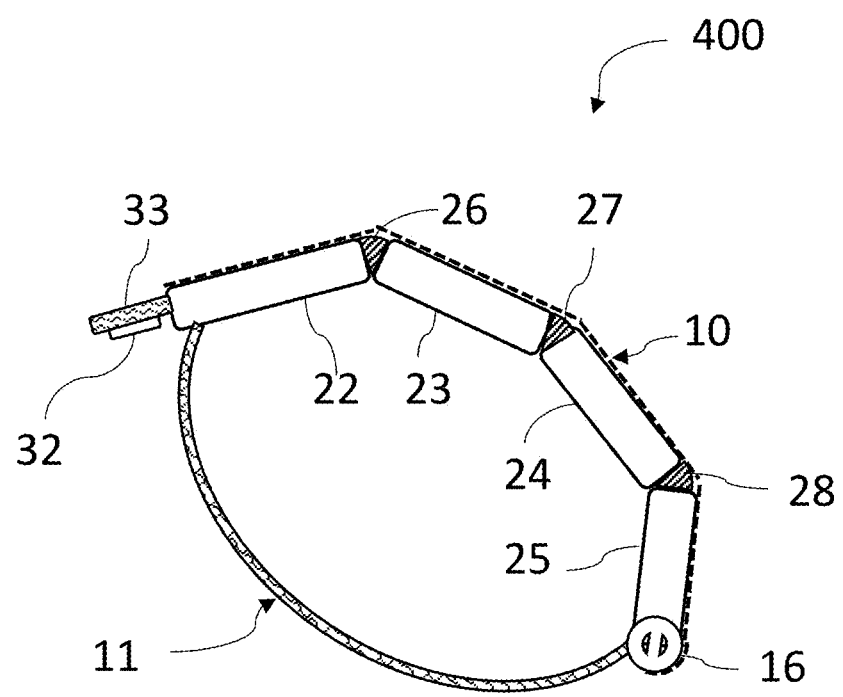
FIG. 9 illustrates the side view of a four-sectioned device in wearable mode; a pop-up camera is on the top section and the strap belt has no sliding hinges. Dashed lines represent front display that can slide up and down from the rotating scroll.

In FIG. 9, device 400 has a four-sectioned body 22, 23, 24, and 25, and a pop-up camera module 33 with lens 32 located on top edge of section 22. When not taking pictures, camera 33 can be depressed and hide inside section 22, there is therefore no need for strap 11 to have a sliding hinge. However, a sliding hinge can still be added for the purpose of adjusting strap 11 opening sizes. Dashed lines 10 above each section represent slidable front display extended into rotating end scroll 16. When used as a wearable, display on certain selected sections can be turned off to conserve battery life.

The invention claimed is:

1. A sectioned smartphone device, comprising:
    a body casing divided into a plurality of short sections linked by bendable hinges integrated to the casing, with section internal spaces open and connected to each other;
    a bendable touchscreen display that is slidable on device casing top surface and connected to a segment of flexible display rolled up in a rotating end scroll; and
    a detachable strap mounted to device casing backside.

2. The sectioned smartphone device according to claim 1, wherein all sections in device body have equal lengths and dimensions.

3. The sectioned smartphone device according to claim 1, wherein at least one section has a length longer than other sections.

4. The sectional smartphone device according to claim 1, wherein the end scroll is spring-loaded for keeping tension to front display and for self-adjusting rotations to release or retract stored display segment.

5. The sectional smartphone device according to claim 1, wherein the body sections, touchscreen display, and backside strap remain flat and straight as a tablet phone.

6. The sectioned smartphone device according to claim 1, wherein the detachable strap is connected to one or more slidable, lockable, and removable hinges attached to device casing.

7. The sectioned smartphone device according to claim 1, wherein the detachable strap covers fully device body backside as a protective back cover.

8. The sectioned smartphone device according to claim 1, wherein the detachable strap has a narrow band section or other shapes covering only partially device body backside.

9. The sectional smartphone device according to claim 1, wherein the detachable strap is elastic, expandable, and having at least one optically-transparent opening surrounding rear-facing camera lenses on device backside.

10. The sectioned smartphone device according to claim 1, wherein the first body section contains a pop-up camera module that allows rotation of camera lenses to different angles.

11. The sectional smartphone device according to claim 1, wherein the body sections and touchscreen display are bent as a polygon wearable device having a loose, flexible strap as a wristband.

12. The sectioned smartphone device according to claim 11, wherein the body hinges bend towards device backside by expansion at top and contraction at bottom.

13. The sectional smartphone device according to claim 11, wherein the end scroll connected to front touchscreen display has a stored display segment with sufficient length to cover maximum front display elongation needed to cover expansion over hinged areas.

14. The sectional smartphone device according to claim 11, wherein the detachable strap can be removed and re-attached to device casing from one end or both ends.

15. The sectional smartphone device in according to claim 11, wherein displays of peripheral sections can be turned off to conserve energy consumption.

* * * * *